United States Patent [19]

Sakowski

[11] 3,872,219

[45] Mar. 18, 1975

[54] PROCESS FOR MANUFACTURING OF CHLORINATED LIME SOLUTION

[75] Inventor: Walter J. Sakowski, Cleveland, Tenn.

[73] Assignee: Olin Corporation, New Haven, Conn.

[22] Filed: Sept. 26, 1973

[21] Appl. No.: 400,872

[52] U.S. Cl. .............................. 423/474, 423/497
[51] Int. Cl.... C01b 11/06, C01f 11/28, C01f 11/24
[58] Field of Search ............................ 423/474, 497

[56] References Cited
UNITED STATES PATENTS

| | | | |
|---|---|---|---|
| 1,713,650 | 5/1929 | George et al. ...................... | 423/474 |
| 1,718,287 | 6/1929 | MacMullin et al. ................ | 423/474 |
| 3,036,013 | 5/1962 | Jaszka et al. ..................... | 423/474 X |
| 3,767,775 | 10/1973 | Tatara et al. ...................... | 423/474 |

FOREIGN PATENTS OR APPLICATIONS 246,000   1/1926   Great Britain ..................... 423/474

Primary Examiner—Edward Stern
Attorney, Agent, or Firm—Donald F. Clements; T. P. O'Day; J. B. Haglind

[57] ABSTRACT

A process for the preparation of chlorinated lime solution having a low iron content in which an aqueous slurry of lime containing iron impurities is admixed with an iron reducing proportion of an alkali metal silicate or alkali metal hydroxide. The mixture is chlorinated to form a slurry of insoluble impurities including iron in a chlorinated lime solution comprising calcium hypochlorite and calcium chloride. The insoluble impurities are separated and a chlorinated lime solution having low iron content is obtained which has improved stability. The chlorinated lime solution may be used as bleach liquor or further reacted to produce a calcium hypochlorite product having a greatly reduced iron content which enhances stability and gives improved color characteristics.

18 Claims, No Drawings

PROCESS FOR MANUFACTURING OF CHLORINATED LIME SOLUTION

This invention relates to the manufacture of chlorinated lime solution having improved stability. More particularly, the invention relates to the production of chlorinated lime solution having a low iron content. Chlorinated lime solution is useful as a bleaching agent and, in addition, is used in the production of calcium hypochlorite, widely employed in the disinfection of swimming pool waters.

The chlorination of an aqueous slurry of lime produces a chlorinated lime solution or bleach liquor, which is an aqueous solution comprising calcium hypochlorite and calcium chloride. Lime used in the production of chlorinated lime solution contains impurities including iron compounds. During the chlorination of an aqueous slurry of lime, most of the impurities remain insoluble and can be separated, for example, by filtration or centrifugation. A portion of the iron present as an impurity in the lime is, during chlorination, converted from an insoluble form to a soluble form which remains in the chlorinated lime solution. This solubilized iron present as iron compounds and iron ions, hereinafter referred to collectively as iron impurities, is deleterious to the chlorinated lime solution as it reduces its stability during storage.

It is known to chlorinate lime in the presence of sodium hydroxide, see, for example U.S. Pat. Nos. 1,718,285, 1,718,287 and 3,251,647. In these processes large amounts of sodium hydroxide are employed which react with the lime during chlorination to form a thick aqueous slurry of solid calcium hypochlorite in a solution of sodium chloride. The solid calcium hypochlorite absorbs iron impurities present and these are not easily separated from the calcium hypochlorite.

Sodium hypochlorite solutions have been treated with silicon compounds to remove iron impurities. For example, U.S. Pat. No. 3,557,010 teaches the removal of iron from sodium hypochlorite solutions by the addition of silica compounds. Extended periods of time, however, were required to reduce the iron content of the solution.

Addition of sodium silicate to calcium hypochlorite solutions was found to form a precipitate according to J. D. Carter, *Ind. and Eng. Chemistry*, Vol. 18, 248–252 (1962). However, there is no teaching of inhibiting solubilization of iron during chlorination of aqueous lime slurry.

As mentioned above, a primary use of chlorinated lime solution is in the manufacture of crystalline solid calcium hypochlorite, $Ca(OCl)_2$. The presence of large quantities of iron is harmful to the solid $Ca(OCl)_2$ as it reduces its stability during long term storage and in addition, its presence discolors the crystalline product. In the manufacture of calcium hypochlorite, the continuous processes employed in the production of solid $Ca(OCl)_2$ do not permit a period of days to form a precipitate which eventually removes the iron as is the case with sodium hypochlorite.

Therefore there is need for a method for the removal of iron impurities in the production of chlorinated lime solutions which is efficient, rapid and does not introduce additional impurities into the product.

An additional object of the present method is to produce a chlorinated lime solution having greater stability.

A futher object of the present method is to chlorinate an aqueous lime slurry containing iron impurities wherein these iron impurities are substantially removed.

Another object of the method of the present invention is the production of a calcium hypochlorite product having improved stability and optical properties.

These and other objects of the invention are accomplished in a method of inhibiting the solubilization of iron from lime during the chlorination of an aqueous slurry of lime which comprises admixing the aqueous slurry with an iron solubilization inhibiting proportion of an alkali metal compound selected from the group consisting of alkali metal silicates and alkali metal hydroxides. The iron solubilization inhibiting proportion generally ranges from about 0.1 to about 8 percent by weight of the lime on a dry basis.

More in detail, in the process of the present invention lime is mixed with water to form an aqueous slurry of lime. The lime employed includes impurities such as iron compounds, silica, aluminum salts, magnesium salts, magnesia, unburned limestone, (calcium carbonate and magnesium carbonate) and other compounds in trace quantities. These impurities represent from about 1 to about 15 percent and generally from about 3 to about 10 percent by weight of the lime.

Typical illustrative specifications for a preferred lime feed and for an acceptable lime feed are as follows:

| Component | Preferred | Acceptable |
|---|---|---|
| $Ca(OH)_2$ min.% | 95.0 | 85 |
| $CaCo_3$ max.% | 1.0 | 3.0 |
| $MgO$ max.% | 0.5 | 3.5 |
| $SiO_2$ max.% | 0.5 | 2.5 |
| $Fe_2O_3 + Al_2O_3$ max.% | 0.5 | 1.5 |
| $CaSO_4$ max.% | 0.5 | 1.5 |

The average particle size of fresh lime added to the process generally is substantially all −325 mesh (wet screen analysis) but particles up to about −200 mesh may be employed if desired.

In lime suitable for use in the production of chlorinated lime solution, iron impurities are present in concentrations of more than about 200 and usually from about 200 to about 1,500 parts per million or higher. In preparing chlorinated lime solution, sufficient lime is mixed with water to form an aqueous slurry containing from about 10 to about 35 percent, and preferably from about 15 to about 25 percent by weight of active lime. Active lime is defined by the amount of $Ca(OH)_2$ in the lime. In the table above, for example, the preferred dry lime feed has an active lime content of at least 95 percent.

Chlorination of the aqueous slurry of lime forms a chlorinated lime solution containing calcium hypochlorite and calcium chloride. During the chlorination, most of the lime impurities remain insoluble and these are readily removed from the chlorinated lime solution. An exception is the iron present, a portion of which solubilizes as the chlorination takes place, increasing the iron content in the chlorinated lime solution. The portion of iron which solubilizes during chlorination, can be for example, up to about 50 percent of the iron originally present in the lime. Thus, when the insoluble materials are separated from the chlorinated lime solution, for example by filtering or centrifuging, a significant amount of iron remains in the chlorinated lime solution.

To reduce the iron content in the chlorinated lime solution by inhibiting iron solubilization, the method of the present invention admixes an alkali metal silicate or alkali metal hydroxide with the lime. Alkali metal silicates suitable for reducing the iron content in chlorinated lime solution include those of sodium, potassium and lithium, with sodium silicate being preferred. The alkali metal silicates may be added in any suitable form, for example, as the solid silicate or as an aqueous solution. For convenience of handling it is preferred to add the alkali metal silicate as an aqueous solution. The alkali metal silicate solution used may be of any desired concentration for example, having a weight ratio of $SiO_2$ to alkali metal oxide of from about 0.5:1 to about 4:1. Preferably used are silicate solutions having a weight ratio of $SiO_2$ to alkali metal oxide of from about 1:1 to about 3.5:1.

The iron solubilization inhibiting proportion of alkali metal silicate added to the aqueous slurry of lime may be any suitable amount, for example, an amount equivalent to from about 0.1 to about 8 percent and preferably from about 0.25 to about 3 percent by weight of the lime on a dry basis. Greater amounts of the silicate may be employed but are not required.

The alkali metal silicate may be added to the lime in any convenient manner, for example, it may be mixed with the lime or with an aqueous slurry of the lime. In a preferred embodiment, the alkali metal silicate solution is mixed with a portion of the water used to prepare the aqueous lime slurry. The silicate is normally added at room temperature although any convenient temperature may be used. In an additional embodiment, the alkali metal silicate may be added to the chlorinated lime solution prior to the filtration removing insoluble impurities.

Alkali metal hydroxides suitable for use in the process of the present invention include those of sodium, potassium or lithium, with sodium being the preferred hydroxide.

Any form of alkali metal hydroxide may be used, for example, the solid salt or an aqueous solution, however a concentrated aqueous solution containing at least 40 percent by weight of the alkali metal hydroxide is preferably used.

The alkali metal hydroxide is added in amounts able to reduce the iron content of the lime to the desired level without forming large amounts of sodium chloride. Suitable amounts of alkali metal hydroxide are, for example, from about 0.1 to about 8 percent and preferably from about 0.25 to about 5 percent by weight of the lime on a dry basis.

The alkali metal hydroxide may be added to the lime in any convenient manner, for example, it may be mixed with the dry lime or with an aqueous slurry of the lime. In a preferred embodiment, the alkali metal hydroxide solution is mixed with a concentrated slurry of lime prior to dilution to the desired slurry content. The hydroxide is normally added at room temperature although any convenient temperature may be used. In an additional embodiment, the alkali metal hydroxide may be added to the chlorinated lime solution prior to filtration removing insoluble impurities.

Following the mixing of the lime, water and alkali metal silicate or alkali metal hydroxide, the mixture is chlorinated. Suitable chlorinating agents are for example, chlorine, added in either the liquid or gaseous form or for example, as hypochlorous acid. When chlorine is the chlorinating agent, a chlorinated lime solution of calcium hypochlorite and calcium chloride containing insoluble impurities is formed, according to the following equation:

(1) $Ca(OH)_2 + Cl_2 \rightarrow \frac{1}{2} Ca(ClO)_2 + H_2O + \frac{1}{2} CaCl_2$ Chlorination of the aqueous solution is carried out at any convenient temperature, for example, from about 20° to about 35°C.

Without inhibiting iron solubilization the chlorinated lime solution contains from about 30 to about 125 parts per million or iron. Employing the method of the present invention for inhibiting iron solubilization, the chlorinated lime solution contains from about 0.5 to about 10 parts per million of iron impurities.

Insoluble impurities are separated from the chlorinated lime solution by any suitable means, for example, by filtering or centrifuging to give a chlorinated lime solution comprising from about 10 to about 18 percent by weight of $Ca(OCl)_2$, from about 7 to about 13 percent by weight of $CaCl_2$, the remainder being water and less than 2 percent by weight of soluble materials such as $Ca(ClO_3)_2$. This chlorinated lime solution may be sold as bleach liquor, used for example in the bleaching of paper pulp. It may also be dried to produce a bleaching powder.

In addition, the chlorinated lime solution may be used in the manufacture of calcium hypochlorite. In one process, the chlorinated lime solution is mixed with an alkali metal hypochlorite, for example, sodium hypochlorite. The hypochlorite may be prepared in situ by reacting an alkali metal hydroxide and chlorine. An aqueous slurry is formed comprising calcium hypochlorite and an alkali metal chloride.

In another process alkali metal hydroxide may be reacted with the chlorinated lime solution and the resulting slurry is chlorinated, preferably continuously in any suitable chlorination apparatus provided with agitation means for maximum contact between chlorine and slurry. Where it is necessary to remove excess water, an evaporative chlorination technique such as described in U.S. Pat. No. 3,241,912, issued to Bernard H. Nicolaisen on Mar. 22, 1966, may be employed. Temperature during this chlorination step is maintained within the range from about 0° to about 40° and preferably from about 20° to about 30°C.

During the chlorination, any lime present reacts to form calcium hypochlorite. Calcium chloride present reacts with the alkali metal hypochlorite present to form additional calcium hypochlorite and an alkali metal chloride. The resulting product of the chlorination reaction is a paste comprised of solid calcium hypochlorite dihydrate and a paste liquor which is predominately an aqueous solution of sodium chloride and calcium hypochlorite.

The paste is conveyed to a separator, for example, a filter, centrifuge or other suitable solid-liquid separating apparatus capable of separating a moist cake of calcium hypochlorite dihydrate crystals from the aqueous solution of sodium chloride containing some calcium hypochlorite.

Moist cake from the separator contains from about 40 to about 60 percent by weight of $Ca(OCl)_2 \cdot 2H_2O$, from about 2 to about 15 percent by weight of NaCl, and from about 40 to 50 percent by weight of water.

This moist cake may be used directly in the treatment of water systems such as swimming pools and the like, but is generally dried and stored prior to use. The moist cake is dried by known means, for example, using a spray dryer, turbodryer or vacuum dryer where appropriate temperature ranges are employed to give a product having a calcium hypochlorite content from about 60 to about 85, a water content below about 10 percent by weight and the bulk of the remainder being sodium chloride.

In addition to the above process for producing calcium hypochlorite, the method of the present invention for inhibiting iron solubilization in the chlorination of an aqueous slurry of lime can be employed in a wide variety of processes for preparing calcium hypochlorite and bleach liquor. Typical illustrations include those processes described in U.S. Pat. Nos. 2,889,199, 2,965,443, 3,094,380, 3,134,641, 3,241,912 and 3,584,996.

Using the process of the present invention to prepare chlorinated lime solutions from lime originally containing at least 200 parts per million of iron impurities, when these solutions are utilized in the production of crystalline calcium hypochlorite having from about 60 to about 85 percent $Ca(OCl)_2$, the iron impurity content of the calcium hypochlorite produced will be from about 2 to about 50 parts per million. Use of the alkali metal silicates or alkali metal hydroxides in the iron inhibiting proportions disclosed does not adversely effect the separation of insoluble impurities.

The following examples are presented to illustrate the invention more fully. All parts and percentages are by weight unless otherwise specified.

EXAMPLE 1

To a lime chlorinator were added 80 grams of lime having an iron impurity content of 640 parts per million and 328 grams of water. Also added were 1.1 grams of sodium silicate solution in 10 milliliters of water to give a silicate content of 0.5 percent based on the weight of dry lime. The sodium silicate solution had a weight ratio of $SiO_2$ to $Na_2O$ of 2.5:1. The lime slurry-silicate solution was mixed for about 15 minutes and chlorine introduced and the slurry chlorinated at a temperature of 35°C. until an excess of alkali of 0.6 percent remained. Insoluble impurities were filtered from the chlorinated lime solution and the iron impurity content of this solution was found to be less than 3 parts per million.

COMPARATIVE EXAMPLE

To the lime chlorinator of Example 1 were added 80 grams of lime having an iron impurity content of 640 parts per million and 328 grams of water. The lime slurry was mixed for about 15 minutes and chlorine introduced and the slurry chlorinated at a temperature of 35°C. until an excess of alkali of 0.6 percent remained. Insoluble impurities were filtered from the chlorinated lime solution and the iron impurity content of this solution was found to be about 42 parts per million.

Thus, when using lime samples having the same iron impurity content and employing identical chlorination procedures, Example 1, using sodium silicate to inhibit iron solubilization, at a concentration of 0.5 percent based on the weight of lime on a dry basis, shows a greater than 5 fold reduction in the iron impurity content of the chlorinated lime solution over the iron impurity content of the chlorinated lime solution of the comparative example where no iron solubilization inhibitor was employed.

EXAMPLE 2

Example 1 was repeated using 0.7 grams of pentahydrate sodium meta silicate in 10 milliliters of $H_2O$ to give a ratio of $SiO_2$ to $Na_2O$ of 1:1 in the silicate solution and a silicate content in the lime slurry of 0.5 percent based on the weight of dry lime. Following filtration of insoluble impurities, the chlorinated lime solution had an iron content of about 4 parts per million.

EXAMPLE 3

Water was added to a lime chlorinator containing 100 grams of dry lime having an iron content of 950 parts per million to prepare an aqueous slurry containing 32 percent lime. To the slurry was added 0.8 gram of 50 percent solution of caustic soda by weight of the dry lime. The lime slurry had a caustic soda content of 0.8 percent by weight of the lime on a dry basis. After thorough blending, additional water was added to prepare an aqueous slurry containing 18 percent lime. Chlorine was added until the slurry had an excess alkali content of 0.67 percent. After filtering, a chlorinated lime solution was obtained having an iron content of 10.7 parts per million. Calcium hypochlorite product containing 73 percent $Ca(OCl)_2$ prepared from the chlorinated lime solution had an iron content of about 43 parts per million.

EXAMPLE 4

Example 3 was repeated using dry lime having an iron content of 600 parts per million and 0.72 grams of a 50 percent solution of caustic soda, the lime slurry containing 0.36 percent caustic soda by weight of dry lime. The chlorinated lime solution, after filtration, had an iron content of 8.5 parts per million.

EXAMPLE 5

Sodium silicate solution, having a weight ratio of $SiO_2$ to $Na_2O$ of 3.22:1, was added to water which was then mixed with dry lime having an iron content of 775 parts per million in a mixing tank to give an aqueous slurry containing 19 percent lime and having a silicate content of 5 percent, based on the weight of dry lime. The slurry (560.2 parts per hour) was pumped to a lime chlorinator and chlorine continuously introduced while maintaining an excess of alkali at 0.4 to 0.8 weight percent and a temperature 35° to 40°C. The chlorinated slurry produced was filtered to remove insoluble impurities and 649.2 parts per hour of a chlorinated lime solution was recovered containing 13.2 percent $Ca(OCL)_2$, 10.7 percent $CaCl_2$, 0.6 percent $Ca(OH)_2$ and 76.5 percent $H_2O$ and having an iron content of 2 parts per million. This chlorinated lime solution was pumped to a mixing tank where it was blended with 393.4 parts per hour of a sodium hypochlorite solution containing 28.82 percent NaOCL and 1.8 percent NaOH and 123 parts per hour of a precipitated lime containing 27.36 percent $Ca(OH)_2$ and 9.48 percent NaOCl to form a slurry. Evaporative chlorination of 1132.4 parts per hour of this slurry in a chlorinator at 29°C. and at a pressure of 28 mm., while maintaining 0.6 weight percent excess alkali, gave 921 parts per hour of a paste containing about 15 weight percent of solids. The paste was filtered to give 454 parts per hour of moist cake containing 87.8 percent Ca(OCl)$_2$ on a dry basis. The moist cake was dried to give 227 parts an hour of a product containing 77.3 percent Ca(OCl)$_2$, 5.4 percent water and 16 percent NaCl and an iron content of 10 parts per million.

What is claimed is:

1. A method of inhibiting the solubilization of iron from lime during the chlorination of an aqueous slurry of lime, which comprises chlorinating said slurry of lime in the presence of an iron solubilization inhibiting proportion of an alkali metal compound selected from the group consisting of alkali metal silicates and alkali metal hydroxides, wherein said iron solubilization inhibiting proportion is equivalent to from about 0.1 to about 8 percent by weight of said lime on a dry basis.

2. The method of claim 1 which said lime contains more than about 200 parts per million of iron impurities.

3. The method of claim 1 in which said aqueous slurry of lime is prepared by mixing said lime with water and said alkali metal compound.

4. The method of claim 1 in which said alkali metal compound is an alkali metal silicate selected from the group consisting of sodium silicate, potassium silicate and lithium silicate.

5. The method of claim 4 in which said alkali metal silicate is an aqueous solution having a weight ratio of SiO$_2$ to alkali metal oxide of from about 0.5:1 to about 4:1.

6. The method of claim 5 in which the amount of said alkali metal silicate present in said aqueous slurry of lime is equivalent to from about 0.25 to about 3 percent by weight of lime on a dry basis.

7. The method of claim 6 in which said alkali metal silicate is sodium silicate.

8. The method of claim 2 in which insoluble impurities formed during chlorination of said aqueous slurry of lime are removed from the resulting chlorinated lime solution, and said chlorinated lime solution contains from about 0.5 to about 10 parts per million of iron impurities.

9. The method of claim 1 in which the alkali metal compound is an alkali metal hydroxide selected from the group consisting of sodium hydroxide, potassium hydroxide and lithium hydroxide.

10. The method of claim 9 in which the alkali metal hydroxide is an aqueous solution containing at least about 40 percent by weight of alkali metal hydroxide.

11. The method of claim 10 in which the amount of alkali metal hydroxide is from about 0.25 to about 5 percent by weight of the dry lime.

12. The method of claim 11 in which the alkali metal hydroxide is sodium hydroxide.

13. A method for the manufacture of calcium hypochlorite from lime containing iron, which comprises:
   1. preparing an aqueous slurry of lime,
   2. admixing said aqueous slurry of lime with an iron solubilization inhibiting proportion of an alkali metal compound selected from the group consisting of alkali metal silicates and alkali metal hydroxides, wherein said iron solubilization inhibiting proportion of said alkali metal compound is an amount equivalent to from about 0.1 to about 8 percent of said lime on a dry basis,
   3. chlorinating the resulting mixture,
   4. separating the resulting chlorinated lime solution from insoluble impurities including insoluble iron,
   5. reacting said chlorinated lime solution with an alkali metal hypochlorite to form a paste of solid calcium hypochlorite particles in a liquor,
   6. separating said paste from said liquor, and
   7. drying said paste to form a product having a calcium hypochlorite content of at least about 60 percent by weight.

14. The method of claim 13 in which said alkali metal compound is an alkali metal silicate.

15. The method of claim 13 in which said alkali metal silicate is sodium silicate.

16. The method of claim 13 in which said alkali metal compound is an alkali metal hydroxide.

17. The method of claim 16 in which said alkali metal hydroxide is sodium hydroxide.

18. The method of claim 13 in which the iron solubilization inhibiting proportion of the alkali metal compound is admixed with a portion of the water used in preparing the aqueous slurry of lime.

* * * * *